United States Patent [19]

Mikami

[11] Patent Number: 4,558,774

[45] Date of Patent: Dec. 17, 1985

[54] METHOD AND APPARATUS FOR COLLECTING WEIGHED ARTICLES DISCHARGED FROM COMBINATORIAL WEIGHING SYSTEM

[75] Inventor: Yoshiharu Mikami, Kyoto, Japan

[73] Assignee: Kabushiki Kaisha Ishida Koki Seisakusho, Kyoto, Japan

[21] Appl. No.: 522,564

[22] Filed: Aug. 12, 1983

[30] Foreign Application Priority Data

Aug. 12, 1982 [JP] Japan .................. 57-140815

[51] Int. Cl.⁴ .............. B65G 11/00; G01G 19/32
[52] U.S. Cl. ................................ 193/2 R; 177/25
[58] Field of Search .............. 177/25; 193/2 R; 222/144.5, 145

[56] References Cited

U.S. PATENT DOCUMENTS 4,399,880 8/1983 Konishi .................. 177/25
4,467,880 8/1984 Minamida et al. ........ 177/25

Primary Examiner—Jeffrey V. Nase
Assistant Examiner—Mary Beth O. Jones
Attorney, Agent, or Firm—Staas & Halsey

[57] ABSTRACT

A collecting chute assembly including first and second compound chutes. The first and second compound chutes have an outer chute of inverted, bisected frusto-conical shape with a semicircular upper opening and a semicircular lower opening, and an inner chute of inverted, bisected conical shape disposed within the outer chute via a partitioning plate. The overall chute assembly is of inverted frusto-conical shape and is constructed by uniting the compound chutes by bringing their respective partitioning plates into face-to-face contact, the assembly defining two discharge routes. At the lower ends of the chutes, one discharge route communicates the inner chute of the first compound chute with the outer chute of the second compound chute, and the other communicates the inner chute of the second compound chute with the outer chute of the first compound chute. Weighed articles introduced into the inner chute of one of the compound chutes will be guided into the outer chute of the other compound chute to join weighed articles introduced directly into the outer chute, the combined articles being discharged from said outer chute to a point outside the system. The arrangement is such that time required for articles to be discharged from both discharge passages is approximately the same.

3 Claims, 7 Drawing Figures

METHOD AND APPARATUS FOR COLLECTING WEIGHED ARTICLES DISCHARGED FROM COMBINATORIAL WEIGHING SYSTEM

BACKGROND OF THE INVENTION

This invention relates to a method and apparatus for collecting weighed articles discharged from a combinatorial weighing system.

A combinatorial weighing system generally has a plurality of weighing machines and operates by computing combinations based on weight values obtained from the weighing machines, selecting a combination of weights which, when summed, gives a total value equal to a set weight or set number, or closest to the set weight or set number within preset allowable limits, and discharging weighed articles from the weighing machines belonging to the selected combination. In the prior art, the discharged articles are collected in a manner which will now be described.

As shown in FIG. 1, each of the weighing machines in the combinatorial weighing system is composed of a weighing hopper and a weight sensor associated therewith. The weights of articles supplied into these weighing hoppers $A_1, A_2, \ldots A_n$ are measured by the associated weight sensors $B_1, B_2, \ldots B_n$, the total weights of all possible combinations of the weighed articles are computed, with the number of weight values in each combination being arbitrary or predetermined, the total weight values are compared with a set weight serving as a target, a combination is selected giving a total combined weight equal to the set weight or closest to the set weight within preset allowable limits, the articles in the weighing hoppers associated with the selected weighing machines are discharged into a collecting chute C, and the discharged articles are collected at the bottom of the chute centrally thereof and then introduced into a timing hopper D where the articles are recovered.

Alternatively, the weight values found by the weight sensors $B_1, B_2, \ldots B_n$ are divided by the unit weight of the articles to give the number of articles in each weighing hopper, different combinations of article numbers are added to obtain a number of the articles equal or closest to a set number, and these articles are discharged from their weighing hoppers and recovered.

Although high accuracy can be realized in either case, there is increasing demand for a combinatorial weighing system with a higher weighing capacity. To improve weighing capacity, it is necessary to elevate the rate of supply and the measuring speed. In addition, it is of utmost importance that the weighed articles, which are discharged at the end of each weighing operation and then slide along the chute C under their own weight, be collected and discharged from the system efficiently.

To this end, various collecting chute configurations have been devised, as shown by way of example in FIGS. 2 through 4. The chute shown in FIG. 2 comprises a collecting chute 3 having an inlet opening 1 and a discharge opening 2, an an intermediate shutter 4 suspended above the discharge opening 2. A predetermined number of weighing hoppers A are arranged circumferentially above the inlet opening 1 of the collecting chute 3. Articles are discharged from the weighing hoppers A on opening the hoppers and are collected by the collecting chute 3 and supplied to a timing hopper D disposed below the collecting chute 3. The intermediate shutter 4 is raised and lowered depending upon the rate at which the articles slide downwardly along the chute 3. Thus, the shutter 4 separates the articles currently discharged from the weighing hoppers A from the articles discharged at the end of the previous weighing cycle, the separation taking place at the mid-portion of the collecting chute 3. Articles which the shutter 4 has allowed to pass are recovered in the timing hopper D.

It should be noted that there are situations where the timing hopper D is not provided because of a connection between the combinatorial weighing system and a packaging machine associated therewith. In such case the articles are introduced into the packaging machine directly from the chute, or a distributing device is provided for operatively linking the single combinatorial weighing system with two packaging machines.

In the arrangement provided with the shutter 4, combinatorial weighing can take place at a rate higher than that ordinarily obtained. By virtue of the intermediate shutter 4 provided at the mid-portion of the collecting chute 3, articles previously discharged are not permitted to mix with articles currently discharged, so that articles released by the weighing hoppers A at the end of each weighing cycle can be recovered in the timing hopper D in good order regardless of the higher rate of the combinatorial weighing operation.

However, when the collecting chute 3 is constructed in the above-described manner, it is necessary to provide a mechanism for vertically displacing the intermediate shutter 4 in synchronism with the opening and closing of the weighing hoppers A, thus complicating the construction of the apparatus. Moreover, the article discharge capacity cannot be increased beyond a certain limit because the collecting chute 3 is provided with movable portions.

In addition, since the collecting chute 3 has only one discharge opening 2, it is necessary to provide a distributing device when the combinatorial weighing system is operatively linked with a twin-tube packaging device. In such case, the distributing capacity of this device poses a major problem.

FIGS. 3 and 4 show an example of the conventional separate-type collecting chute having a discharge passage separated or divided into two routes. An inner chute section 5 and an outer chute section 6 of inverted frusto-conical shape are arranged to intersect each other so that respective upper supply openings 7, 8 thereof are arranged concentrically and respective lower discharge openings 9 and 10 are arranged in side-by-side relation. The narrow discharge passage defined between the outer chute 6 and inner chute 5 is partially cut out. Thus, the collecting chute has two independent discharge passages.

The operation of the arrangement shown in FIGS. 3 and 4 will now be described. The combinatorial weighing system includes a predetermined number of weighing hoppers B having a double-door construction and dual discharge openings arranged along the upper rim of the supply openings 7 and 8 of the inner and outer chutes 5 and 6. The weighing hoppers B of the double-door construction release their articles into whichever of the inner and outer chutes 5 or 6 is designated. The weighed articles are collected separately by these chutes which in turn discharge the articles separately.

With this arrangement, the configuration of the inner and outer chutes 5 and 6 is complicated. Moreover, as illustrated in the drawings, all of the weighing hoppers cannot release their articles exclusively into the inner chute 5 or outer chute 6 by the opening of double doors. Those weighing hoppers B' arranged above the inner chute 5 where the outer chute 6 has been cut out must necessarily be of single door type, and the discharge route for these weighing hoppers is limited to the inner chute 5. This places a limitation upon the combinatorial computations, and great difficulty may be experienced in terms of accuracy and function when the combinatorial weighing system is to be operatively linked with a pair of simultaneously operating packaging machines and a pair of alternating or independently operating packaging machines.

As shown in FIG. 5, it may be contemplated to have the entire circumference of the inner chute 5 surrounded by the outer chute 6 so that the weighed articles may be discharged from any of the weighing hoppers B into either of the chutes 5 and 6. With this arrangement, however, the inner and outer chutes 5 and 6 have different discharge capacities owing to a difference in the rate at which weighed articles slide downwardly therealong. This is because the sloping surfaces of the inner and outer chutes 5 and 6 have widely different angles of inclination. Indeed, the angle of inclination of the sloping surface differs for different portions of the same chute. In addition, a narrow discharge passage is formed at the intersection of the outer chute 6 and inner chute 5, thereby hampering the discharge of articles from the outer chute 6.

SUMMARY OF THE INVENTION

Accordingly, an object of the present invention is to provide a weighed article collection method and apparatus featuring a large article discharge capacity by means of a simple arrangement, and wherein it is possible to raise processing capacity per unit time.

According to the present invention, the foregoing object is attained by providing a weighed article collecting system which includes first and second compound chutes. Each compound chute comprises an outer chute of inverted, bisected frusto-conical shape having a semicircular upper opening and a semicircular lower opening, and an inner chute of inverted, bisected conical shape disposed within the outer chute by being affixed to a partitioning plate. The first and second compound chutes are combined into a chute assembly of inverted frusto-conical shape by bringing their respective partitioning plates into face-to-face agreement, the assembly having two discharge routes. One discharge route communicates the inner chute of the first compound chute with the outer chute of the second compound chute at the lower portions of the chutes. The other discharge route communicates the inner chute of the second compound chute with the outer chute of the first compound chute at the lower portions of the chutes. Thus, weighed articles introduced into the inner chute of one of the compound chutes will be guided into the outer chute of the other compound chute to join weighed articles introduced directly into said outer chute, the combined articles being discharged from said outer chute to a point outside the system. With this arrangement, weighed articles are discharged from the two discharge routes in approximately the same length of time. In other words, the two discharge routes have approximately the same discharge capacity.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
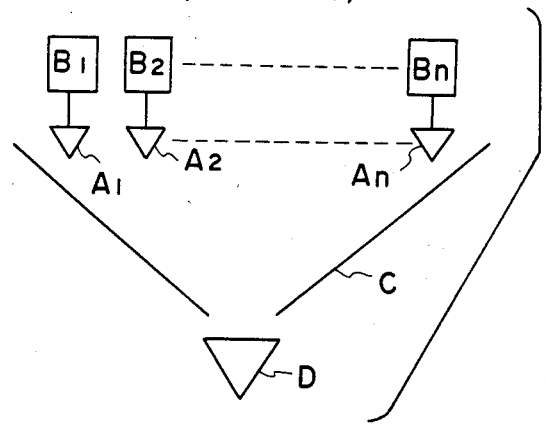
FIG. 1 is a schematic diagram showing the construction of a weighing and collecting mechanism in a combinatorial weighing system.
Figure 2:
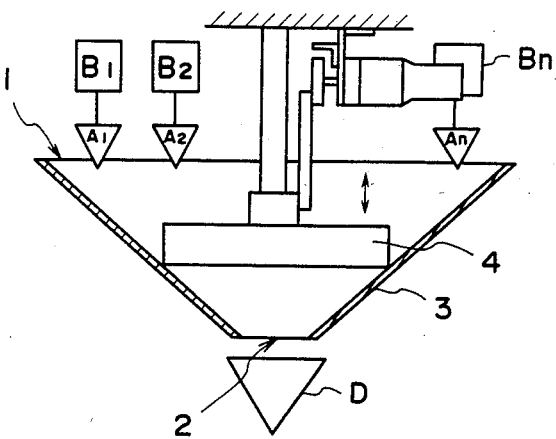
FIGS. 2 through 5 are schematic views showing examples of conventional chutes used in a combinatorial weighing system.
Figure 3:
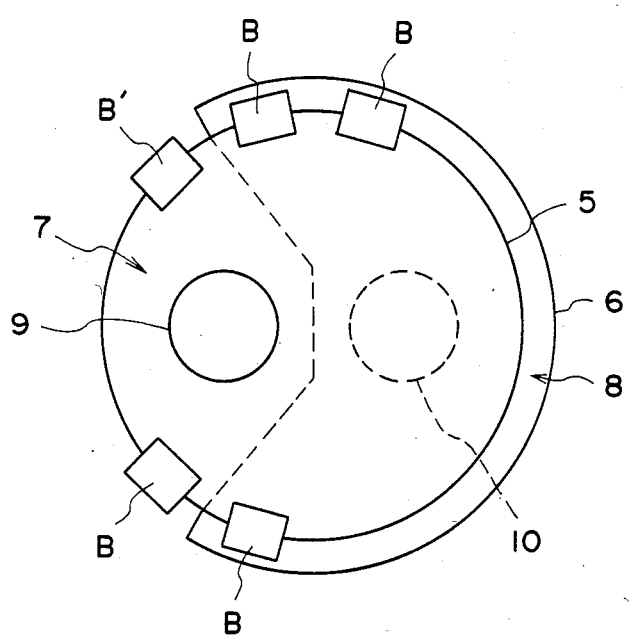
Figure 4:
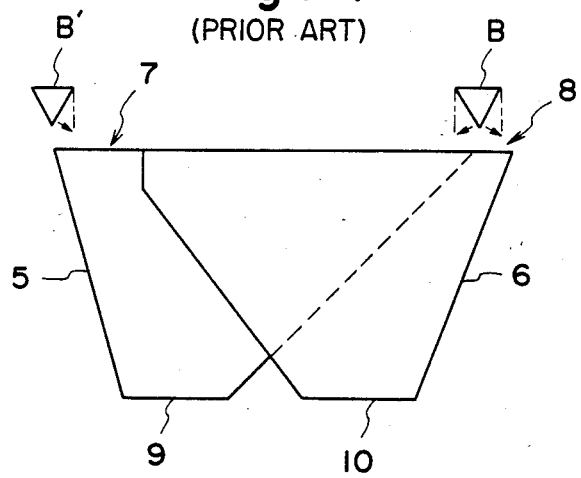
Figure 5:
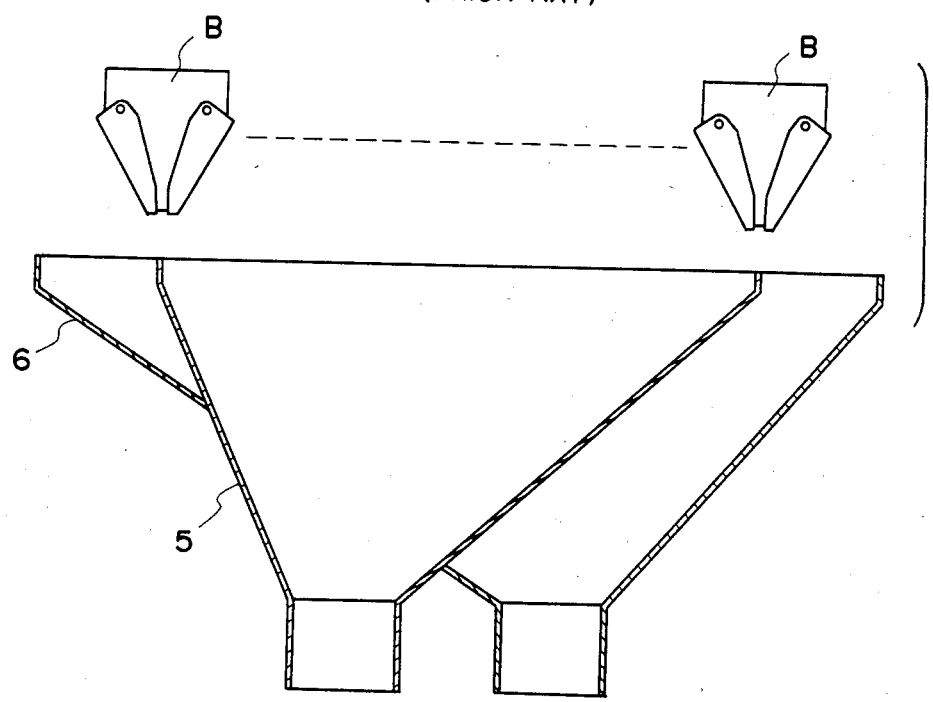
Figure 6:
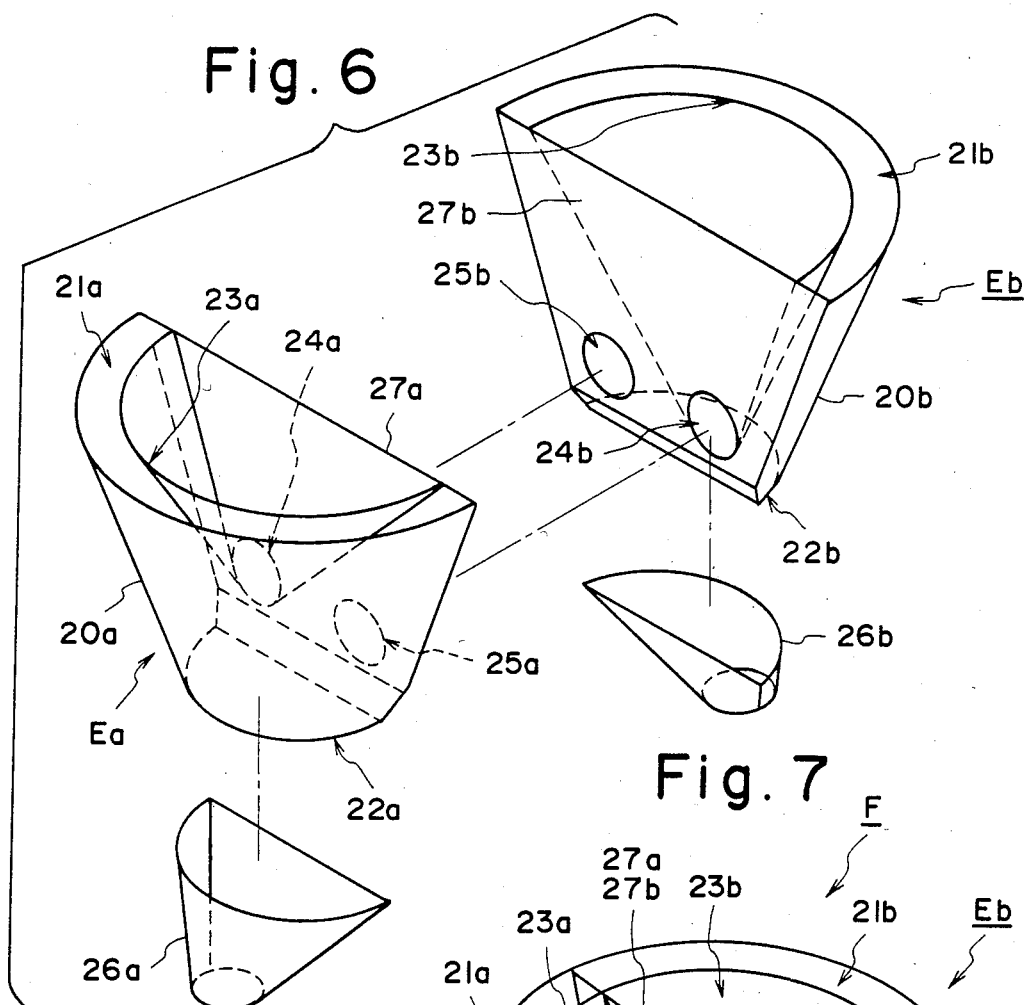
FIG. 6 is an exploded perspective view of a weighed article collecting chute according to the present invention.
Figure 7:
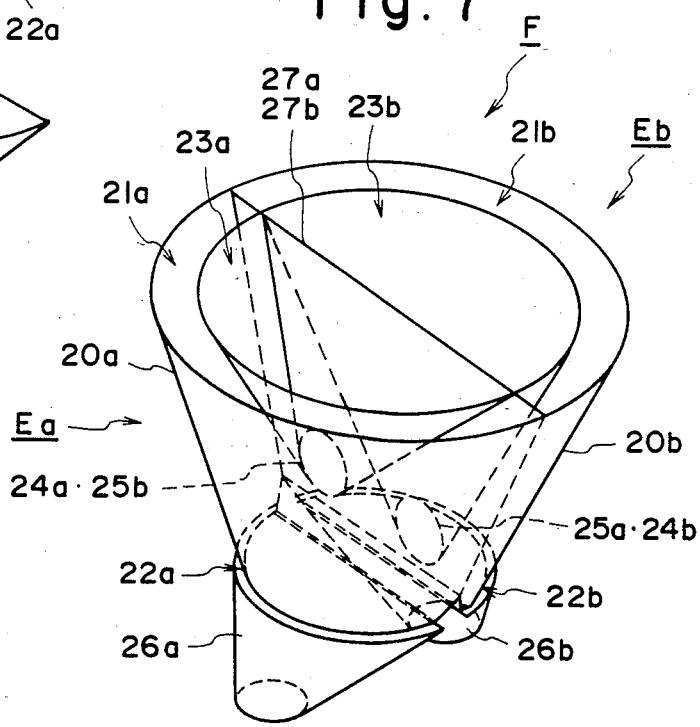
FIG. 7 is a perspective view illustrating the collecting chute of FIG. 6 in the assembled state.

Reference will now be had to the perspective views of FIGS. 6 and 7 illustrating an embodiment of a collecting chute assembly F comprising united first and second chutes Ea, Eb. Numerals 20a, 20b denote first and second outer chutes of inverted, bisected frusto-conical shape having semicircular upper openings 21a, 21b and semicircular lower openings 22a, 22b, respectively. Numerals 23a, 23b denote first and second inner chutes of inverted, bisected conical shape accommodated within the outer chutes 20a, 20b, respectively. The inner chutes 23a, 23b are supported at their upper ends, as by welds or screws, through the intermediary of partitioning plates 27a, 27b to form semicircular openings concentric with the openings 21a, 21b of the outer chutes 20a, 20b, respectively. Numerals 24a, 25a designate through-holes provided in the first partitioning plate 27a at the lower part thereof. Similarly, numerals 24b, 25b designate through-holes provided in the second partitioning plate 27b at the lower part thereof. The through-holes 24a, 24b are so located as to communicate with the lower portions of the first and second inner chutes 23a, 23b, respectively, accommodated within the respective first and second outer chutes 20a, 20b. Numerals 26a, 26b represent first and second discharge ports disposed below the lower openings 22a, 22b of the first and second outer chutes 20a, 20b, respectively.

The pair of first and second compound chutes Ea, Eb comprising the above-described elements are united into a unitary body, forming the collecting chute assembly F, by bringing the partitioning plates 27a, 27b into perfect fact-to-face alignment. This is the condition, shown in FIG. 7, in which the chute is used. It will be seen that the through-holes 24a, 25a in the partitioning plate 27a are aligned with the through-holes 25b, 24b in the partitioning plate 27b, respectively. In use, weighed articles introduced into the first inner chute 23a flow into the second outer chute 20b through the through-holes 24a, 25b provided in the respective partitioning plates 27a, 27b. These articles then are discharged from the lower opening 22b of the second outer chute 20b to a point outside the system through the second discharge port 26b. On the other hand, weighed articles introduced into the second inner chute 23b flow into the first outer chute 20a through the through-holes 24b, 25a provided in the respective partitioning plates 27b, 27a. These articles then are discharged from the lower opening 22a of the first outer chute 20b to a point outside the system through the first discharge port 26a.

To collect and discharge weighed articles from the combinatorial weighing system through use of the collecting chute assembly F of the present invention having the foregoing construction, a predetermined number of weighing hoppers are arranged along the perimeter of a circle above the chute F. When weighed articles are released from the selected weighing hoppers of the combinatorial weighing system at the end of the first weighing cycle, these articles may, by way of example, be introduced into the outer chute 20a of the first compound chute Ea and into the inner chute 23b of the second compound chute Eb, in which case the articles introduced into both the inner and outer chutes 20a, 23b are discharged to the outside from the lower opening 22a of the first outer chute 20a via the first discharge port 26a. Then, when articles are released from the selected weighing hoppers at the end of the next weighing cycle, these articles are introduced into the outer chute 20b of the second compound chute Eb and into the inner chute 23a of the first compound chute Ea. The articles introduced into both the inner and outer chutes 20b, 23a are discharged to the outside from the lower opening 22b of the second outer chute 20b via the second discharge port 26b.

Thus, according to the present invention, first and second compound chutes are provided, each comprising an inner and outer chute. A first discharge route is constructed by the inner chute of the first compound chute and the outer chute of the second compound chute. A second discharge route is constructed by the inner chute of the second compound chute and the outer chute of the first compound chute. Articles released from selected weighing hoppers are discharged into these two discharge routes alternatingly at the end of each combinatorial weighing cycle. With such an arrangement, articles slide downwardly along two discharge routes of approximately equal distances and at approximately the same speed. Accordingly, the time required for the first discharge of weighed articles is substantially the same as that required for the second discharge. This means that the two discharge routes have substantially the same discharge capacity, and makes it possible to separately collect the batches of articles obtained from the two discharge routes, and to separately discharge the batches to an external point, all in good order. This arrangement permits a combinatorial weighing system to be operatively linked with two alternatingly operable packaging machines or with two simultaneously operable packaging machines in a very simple manner, unlike the prior-art arrangement which relies upon a collecting chute having two discharge routes of different distances and discharge speed, or a chute having a single discharge route and a shutter disposed within the chute, as described earlier.

Furthermore, according to the present invention, any of the weighing hoppers in the circular array thereof overlying the collecting chute assembly can release their articles into any of the chutes 20a, 20b, 23a, 23b, so that their is no limitation upon combinatorial computations. In addition, the collection chute according to the invention has no movable parts such as the aforementioned shutter. This both simplifies construction and affords a large discharge capacity.

As many apparently widely different embodiments of the present invention can be made without departing from the spirit and scope thereof, it is to be understood that the invention is not limited to the specific embodiments thereof except as defined in the claims.

What we claim is:

1. An apparatus for collecting articles, comprising:
a first compound chute including
   a first outer chute having an upper opening and a discharge opening,
   a first inner chute, said inner chute being disposed within said outer chute and
   a first partitioning plate having a first through hole in communication with said first outer chute and a second through hole in communication with said first inner chute;
a second compound chute including
   a second outer chute having an upper opening and a discharge opening,
   a second inner chute, said inner chute being disposed within said outer chute, and
   a second partitioning plate having a third through-hole in communication with said second outer chute and a fourth through-hole in communication with said second inner chute, said first compound chute and said second compound chute being connected so that said first through-hole and said fourth through-hole are in communication and said second through-hole and said third through-hole are in communication;
a first discharge chute having an upper opening in communication with said discharge opening of said first outer chute; and
a second discharge chute having an upper opening in communication with said discharge opening of said second outer chute.

2. An apparatus according to claim 1, wherein said first and second outer chutes have an inverted, bisected frusto-conical shape and a semicircular upper opening, wherein said discharge openings are semicircular, wherein said first and second inner chutes have an inverted, bisected conical shape and a semicircular upper opening and wherein said first and second compound chutes are connected so that the two inverted, bisected frusto-conical chutes form an inverted frustum.

3. An apparatus according to claim 1, wherein said inner chutes of said first and second compound chutes have an upper opening and said upper openings of said inner chutes and said upper openings of said outer chutes are concentrically arranged.

* * * * *

UNITED STATES PATENT AND TRADEMARK OFFICE
CERTIFICATE OF CORRECTION

PATENT NO. : 4,558,774

DATED : December 17, 1985

INVENTOR(S) : Yoshiharu Mikami

It is certified that error appears in the above-identified patent and that said Letters Patent is hereby corrected as shown below:

The term of this patent subsequent to December 18, 2002, has been disclaimed.

Signed and Sealed this

Eighth Day of July 1986

[SEAL]

Attest:

DONALD J. QUIGG

Attesting Officer

Commissioner of Patents and Trademarks